United States Patent
Naddell et al.

(10) Patent No.: US 6,253,091 B1
(45) Date of Patent: Jun. 26, 2001

(54) METHOD AND APPARATUS FOR ESTABLISHING DYNAMIC GROUP COMMUNICATIONS

(75) Inventors: Marc C. Naddell, Schaumburg; Gary W. Grube, Barrington; Mark L. Shaughnessy, Algonquin, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/020,552

(22) Filed: Feb. 9, 1998

(51) Int. Cl.[7] ..................................................... H04B 7/00
(52) U.S. Cl. ............................ 455/519; 455/518; 455/416
(58) Field of Search .................................. 455/450, 452, 455/518, 519, 509, 520, 414, 416, 426, 575; 370/340

(56) References Cited

U.S. PATENT DOCUMENTS

| | | | |
|---|---|---|---|
| 5,014,345 | * | 5/1991 | Comroe et al. ........................ 455/519 |
| 5,279,521 | * | 1/1994 | Johlie et al. ........................... 455/519 |
| 5,287,542 | * | 2/1994 | Hesse et al. ............................. 455/15 |
| 5,371,492 | * | 12/1994 | Lohrbach et al. ............... 340/825.03 |
| 5,398,021 | * | 3/1995 | Moore ............................... 340/825.27 |
| 5,471,646 | * | 11/1995 | Schultz ................................. 455/519 |
| 5,555,446 | * | 9/1996 | Jasinski .................................. 455/517 |
| 5,714,944 | * | 2/1998 | Shimizu ............................ 340/825.44 |
| 5,752,196 | * | 5/1998 | Ahvenainen et al. ................ 455/518 |
| 5,790,962 | * | 8/1998 | Grube et al. ........................... 455/518 |
| 5,929,773 | * | 7/1999 | Nelms et al. ..................... 340/825.52 |

* cited by examiner

*Primary Examiner*—Dwayne Bost
*Assistant Examiner*—Sonny Trinh
(74) *Attorney, Agent, or Firm*—Val Jean F. Hillman

(57) ABSTRACT

A first communication device (18–22) provides a request for the establishment of a group communication to a communication infrastructure (12–14). The request includes a subject matter identifier and may further include a limitation identifier. Based on the subject matter identifier, and the limitation identifier, the communication infrastructure identifies at least one communication device. Having identified the at least one communication device, the communication infrastructure provides a response to the first communication device. The response identifies the at least one communication device and requests feedback as to whether the first communication device desires to establish the group communication with the identified at least one communication device. The first communication device then provides feedback to the communication infrastructure indicating how the group communication should be processed. Based on this feedback, the communication infrastructure processes the group communication.

25 Claims, 4 Drawing Sheets

METHOD AND APPARATUS FOR ESTABLISHING DYNAMIC GROUP COMMUNICATIONS

TECHNICAL FIELD OF THE INVENTION

The present invention relates generally to communication systems and more particularly to dynamically establishing group communications.

BACKGROUND OF THE INVENTION

Communication systems are known to include a plurality of communication devices and supporting wireless infrastructure. The plurality of communication devices include land mobile radios, portable radios, and/or cellular telephones. The supporting infrastructure includes base stations, communication resources, base station controllers, and/or mobile switching centers. To access a communication service, a communication device transmits an inbound signaling word to the communication infrastructure.

Upon receiving the inbound signaling word ("ISW"), the communication infrastructure determines whether the communication device is authorized to access the requested service. If authorized, the communication infrastructure then determines whether there are sufficient communication resources available to service the particular request. If communication resources are available for the particular request, the communication infrastructure allocates them to the requesting communication device. Having obtained the communication resources, the communication device may access the service.

One such service that communication devices may initiate is a group communication. In a group communication, a requesting communication device is requesting that the communication infrastructure establish a group communication between the requesting communication device and targeted communication devices. A group communication request includes the identity of the requesting device and the identity of a pre-established group. The pre-established group is generally referred to as a "talk group." As such, any member of a communication group may establish a group communication with the other members by transmitting a group communication request to the communication infrastructure.

In many group communication applications, the requesting party desires to establish the group communication for a particular reason. The requesting communication device, however, is limited to establishing group communications with members of pre-established groups. As such, a subscriber unit (i.e., a communication device) cannot dynamically establish a group communication.

Therefore, a need exists for a method and apparatus that allows communication devices to establish dynamic group communications.

DESCRIPTION OF A PREFERRED EMBODIMENT

Generally, the present invention provides a method and apparatus for establishing dynamic group communications. This is accomplished by a first communication device providing a request for the establishment of a group communication to a communication infrastructure. The request includes a subject matter identifier and may further include a limitation identifier. Based on the subject matter identifier, and the limitation identifier if included, the communication infrastructure identifies at least one communication device. Having identified the at least one communication device, the communication infrastructure provides a response to the first communication device. The response identifies the at least one communication device and requests feedback as to whether the first communication device desires to establish the group communication with the identified at least one communication device. The first communication device then provides feedback to the communication infrastructure indicating how the group communication should be processed. Based on this feedback, the communication infrastructure processes the group communication. With such a method and apparatus, group communications may be established dynamically based on subject matter and further based on limitation identifiers. As such, a user of a communication device, when a particular subject arises may dynamically establish a group communication based on a particular subject.

Figure 1:
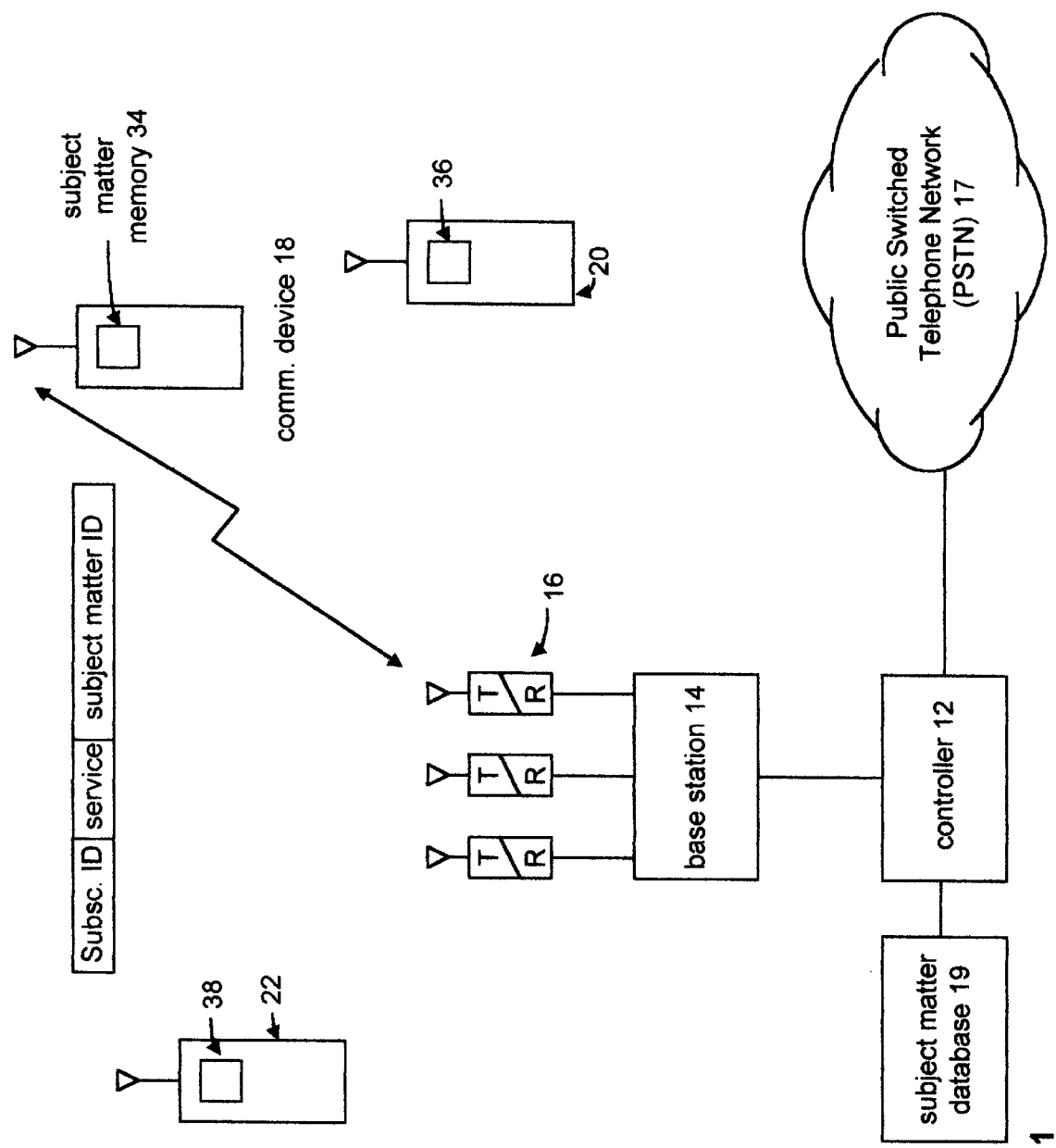
FIG. 1 illustrates a schematic block diagram of a communication system in accordance with the present invention.

The present invention can be more fully described with reference to FIGS. 1 through 7. FIG. 1 illustrates a schematic block diagram of a communication system 10 that includes a controller 12, a base station 14, a plurality of communication resources 16, a plurality of communication devices 18, 20, 22, a subject matter database 19, and coupling to the public switch telephone network ("PSTN") 17. The controller 12 is a processing device such as a computer, workstation, etc. that is programmed with programming instructions in accordance with the methods described in FIGS. 4 and 5. Each of the communication devices 18, 20 and 22 include subject matter memory 34, 36 and 38. The memory 34, 36, 38 may be cache memory, read-only memory, random access memory, floppy disk memory, CD drive memory and/or any other means for storing digital information. The subject matter identifiers stored within memory 34, 36, 38 may be preloaded into the communication devices based on subjects of interest to the operator of the communication device. The subject matter identifiers may also be downloaded from a system administrator at the request of the communication device or may be randomly generated by the operator of the communication device.

Regardless of how the communication device obtains subject matter identifiers, when the communication device desires to establish a dynamic group communication to discuss a particular subject, it transmits an inbound signaling word. The inbound signaling word includes the identity of the requesting communication device, the particular service being requested, a subject matter identifier that identifies the particular subject, and, optionally, a limitation identifier. Upon receiving the request, the controller 12 will either access the subject matter database 19 or provide an outbound signaling word to all, or a portion, of the communication devices to identify the target group of communication devices. In the first instance, the controller identifies target communication devices based on entries in the subject matter database 19, the subject matter identifier, and, optionally, the limitation identifier received from the requesting communication device. If a communication device is flagged in the database 19 as having an interest in the subject matter identified in the requested group communication, the controller will identify the communication device as a potential member of the group. If the limitation identifier is also received, the controller will verify that the communication device is compliant with the limitation identifier. For example, assume that the subject matter is related to a quarterly earning of a company. With this subject matter identified, the controller could identify hundreds of communication devices that have an interest in this subject. The limitation identifier adds a further restriction of only company officers. As such, the dynamic talk group established will include the originating party and the company officers with an interest in the company's corporate earnings. Note that the communication devices may have restrictions placed on them as to what type of subjects a communication device may request based on its attributes. For example, only a corporate officer could make a request to establish a talk group of other officers to discuss the quarterly earnings.

The controller 12 may further identify the targeted communication group based on communication devices' participation parameters, which are stored in the subject matter database 19. The participation parameters indicate the preferences of the operator of the communication device as to which communications the communication device will or will not participate in. As a continuation of the above example, the president of the company may establish his or her participation parameters for particular subjects, for requests initiated by certain officers of the company, for requests initiated from a particular company division or location, etc. As one having ordinary skill in the art will readily appreciate, the types of subjects, the limitation identifiers, and participation parameters have countless combinations for establishing a dynamic communication group.

If the controller 12 utilizes an outbound signaling word (OSW) to identify the targeted communication group, it begins by sending the OSW to the plurality of communication devices. The OSW includes the subject matter identifier and the limitation identifier, if included. Upon receiving the OSW, each communication device determines whether it is qualified to participate in the dynamic group communication. Such a determination is based on the subject matters of interest to the communication device and the limitations of the operator. The determination may further be based on the participation parameters of the communication device. Continuing with the above example, if the communication device receives an OSW that includes the quarterly earnings subject matter identifier and the limitation of officers, the communication device determines whether its subject matters of interest comply with the subject matter of the OSW. In addition, the communication device determines whether its attributes are sufficient to participate in the group communication (i.e., the operator of the communication device is an officer). The communication device then determines whether it will participate in the dynamic group communication based on its participation parameters. If all such inquires are answered positively, the communication device responds with an ISW indicating that it qualifies to participate in the dynamic group communication.

Once the controller has identified at least one other communication device to participate in the dynamic group communication, the controller informs the requesting communication device of the identity of the at least one identified communication device. The requesting device then has the option of establishing the group communication with the identified communication device, canceling the group communication, modifying its subject matter identifier, and/or including or modifying its limitation identifiers. Upon receiving the response, or feedback, from the requesting communication device, the controller establishes the group communication. As such, by allowing a requested communication device to transmit an inbound signaling word that includes a subject matter identifier, dynamic group communications can be established based on a particular subject matter. Thus, users of communication devices and wireless communication systems are able to establish group communications dynamically as opposed to establishing them from static groupings of communication devices.

Figure 2:
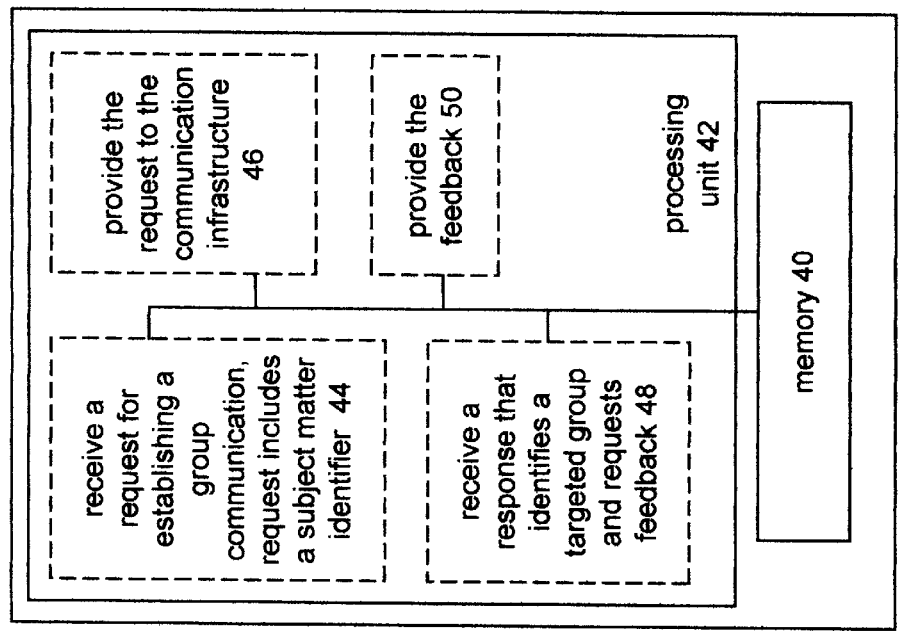
FIG. 2 illustrates a schematic block diagram of a communication device in accordance with the present invention.

FIG. 2 illustrates a schematic block diagram of a communication device 18, 20, 22. The communication device includes memory 40 and a processing unit 42. The processing unit 42 may be a microprocessor, microcontroller, digital signal processor, central processing unit, and/or any other device that manipulates digital information based on programming instructions. The memory 40 may be read-only memory, random access memory, floppy disk memory, CD ROM memory, hard disk memory, magnetic tape memory, and/or any other means for storing digital information.

The memory 40 stores programming instructions that, when read by processing unit 42, causes the processing unit 42 to function as a plurality of circuits 44–50. While reading the programming instructions, the processing unit 42 functions as circuit 44 to receive a request for establishment of a group communication. The request includes a subject matter identifier. The request may be received via a select module on a communication device, via a keypad, via a voice-activated request, or via any other means for inputting requests into a communication device. The processing unit then reads programming instructions that cause it to function as circuit 46 to provide the request to the communication infrastructure. The processing unit 42 then functions as circuit 48 to receive a response from the communication infrastructure. The response identifies a targeted group of other communication devices and requests feedback as to the establishment of the dynamic group communication with the targeted group. The processing unit 42 then functions as circuit 50 to provide feedback. The programming instructions performed by the processing unit 42 will be discussed in greater detail with reference to FIGS. 4, 6 and 7.

Figure 3:
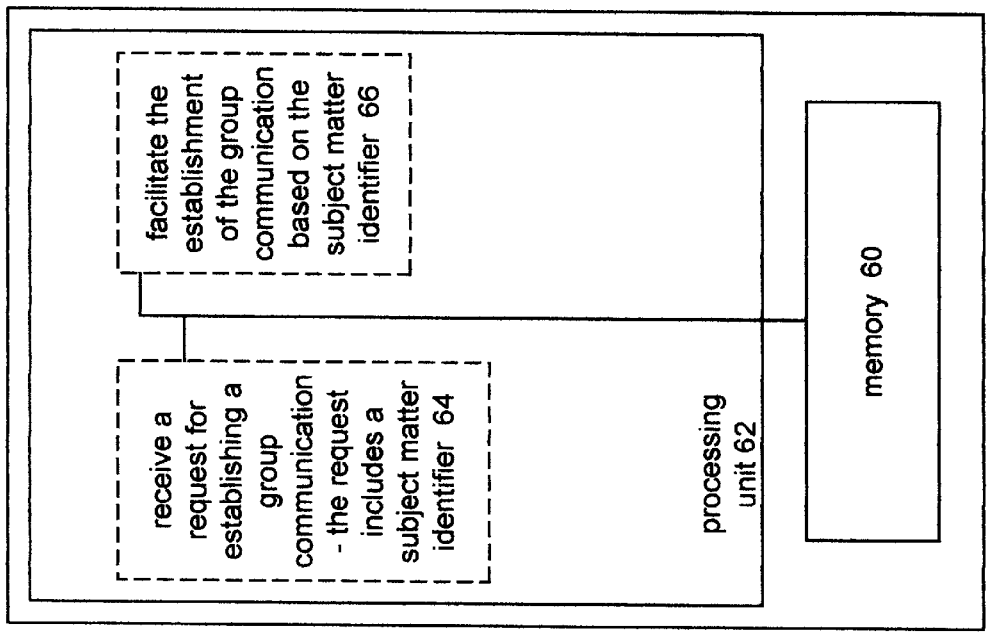
FIG. 3 illustrates a schematic block diagram of a controller in accordance with the present invention.

FIG. 3 illustrates a schematic block diagram of the controller 12. The controller 12 includes a processing unit 62 and memory 60. The processing unit 62 may be a microprocessor, microcontroller, digital signal processor, central processing unit, and/or any other device that manipulates digital information based on programming instructions. The memory 60 may be read-only memory, random access memory, floppy disk memory, CD ROM memory, hard disk memory, magnetic tape memory, and/or any other means for storing digital information.

Memory 60 stores programming instructions that, when read by the processing unit 62, causes the processing unit 62 to function as a plurality of circuits 64 and 66. While reading the programming instructions, the processing unit 62 functions as circuit 64 to receive a request for establishment of a group communication. The request is received from a first communication device and includes a subject matter identifier. Next, the processing unit reads programming instructions that cause it to function as circuit 66 to facilitate the establishment of the group communication based on the subject matter identifier. The programming instructions performed by processing unit 62 will be discussed in greater detail with reference to FIGS. 4 and 5.

Figure 4:
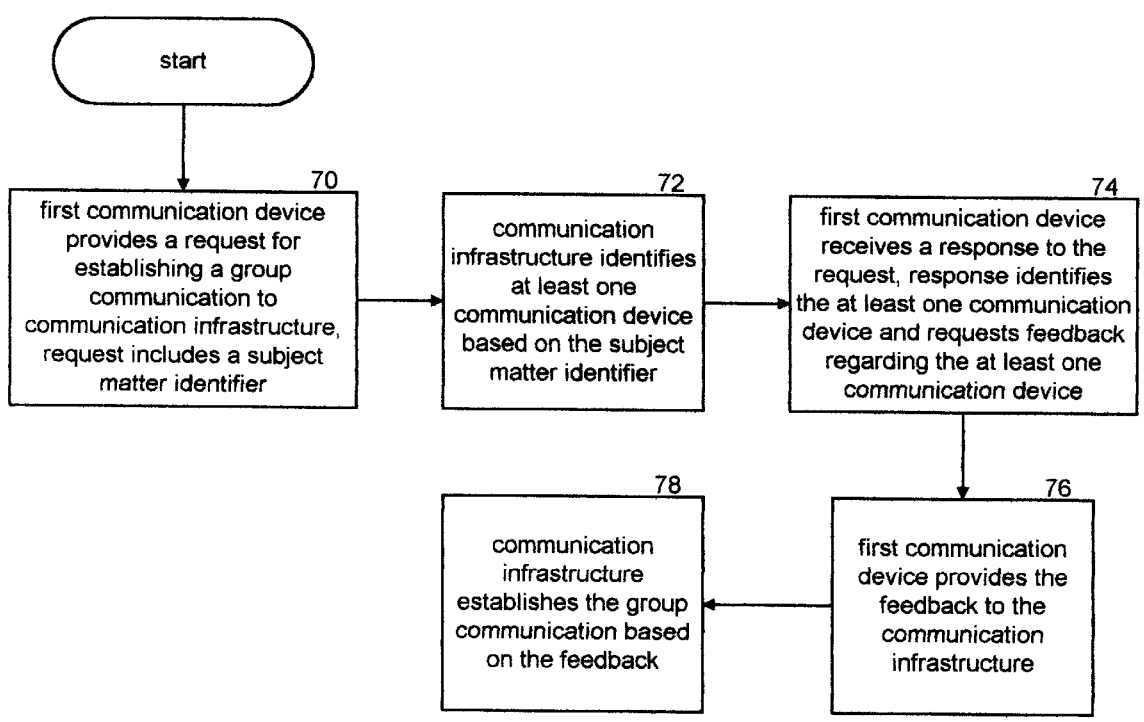
FIG. 4 illustrates a logic diagram of a method for processing dynamic group communications in accordance with the present invention.

FIG. 4 illustrates a logic diagram of a method for providing dynamic group communications in a wireless communication system. The process begins at step 70 where a first communication device provides a request for establishment of a group communication to the communication infrastructure. The request includes a subject matter identifier and may further include a limitation identifier. The process then proceeds to step 72 where the communication infrastructure identifies at least one communication device based on the subject matter identifier. As previously mentioned with reference to FIG. 1, the communication infrastructure may identify the at least one communication device via the subject matter database 19 or by providing an outbound signaling word to a plurality of communication devices and receiving a response thereto.

The process then proceeds to step 74 where the first communication device receives a response to the request. The response identifies the at least one communication device and requests feedback regarding the at least one communication device. The process then proceeds to step 76 where the first communication device provides the feedback to the communication infrastructure. The process then proceeds to step 78 where the communication infrastructure establishes the communication based on the feedback. The feedback provided by the communication device will be discussed in greater detail with reference to FIG. 6.

Figure 5:
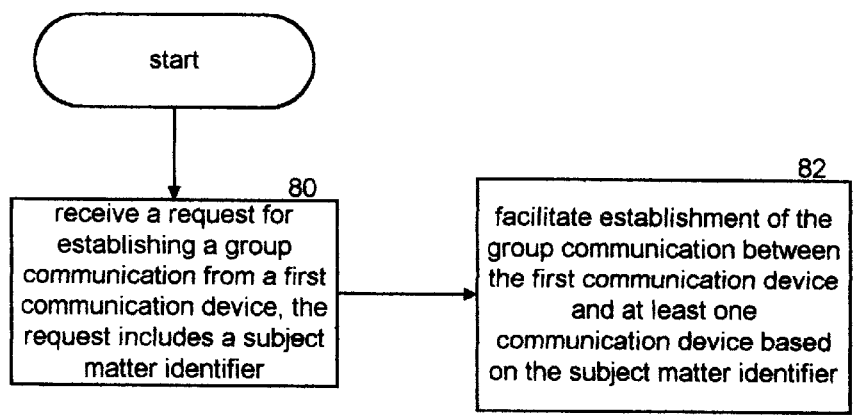
FIG. 5 illustrates a logic diagram of a method for a controller to support the dynamic establishment of group communications in accordance with the present invention.

FIG. 5 illustrates a logic diagram of a method for the controller to facilitate the establishment of a dynamic group communication. The process begins at step 80 where the controller receives a request for establishing a group communication. The request is received from a first communication device and includes a subject matter identifier.

In addition, the request may include a limitation identifier wherein the limitation identifier includes a grade restriction, a location restriction, and/or a qualification restriction. For example, a grade restriction may be utilized within a company such that only executives/officers/directors, etc. would participate in a group communication. The location restriction may indicate that only members located within a geographic area are to participate. For example, if the requesting communication device is located in Chicago, Ill., the location restriction may limit the participants to being within Chicago or the immediate suburbs. The qualification restrictions may indicate the particular expertise level of the operators of the communication device. For example, the requesting communication device may only request that experts in the field participate in the group communication. Other limitation identifiers may include response time, group size limitations, etc. In addition, the limitation identifier may include a combination of prioritized limitations such that the controller parses an initial targeted group into a reasonable group size.

The process then proceeds to step 82 where the controller facilitates the establishment of the group communication between the first communication device and at least one communication device based on the subject matter identifier. As previously mentioned, the controller may identify the at least one communication device by accessing a database, or by providing an outbound signaling word to a plurality of communication devices wherein the outbound signaling word includes the subject matter identifier. If the controller uses the database lookup approach, it determines whether the subject matter attributes of the communication device corresponds to the subject matter identifier. If utilizing the OSW, the controller receives a participation response from the communication devices that have subject matter attributes corresponding to the subject matter identifier. Once at least one communication device has been identified, the controller determines whether the at least one communication device is receptive to being in the group communication. This determination is based on the participation parameters of the at least one communication device. Such participation parameters include geographic location, requesting party identity, time of day, and subject matter qualifications. As such, if the participation parameters of the identified communication device indicate that the communication device is not to participate, the communication device is removed from the targeted group of communication devices.

Once the targeted group of communication devices has been identified, their identity is provided to the requesting communication device. In addition to providing the identity of the communication devices, the controller requests feedback as to the establishment of a group communication with the identified communication devices. The response may be to establish the group with the identified communication devices, to establish the group with a set of the identified communication devices, to repeat the step of identifying a targeted group based on a modified request, or to cancel the group communication. Upon receiving the response, the controller facilitates the establishment of the group communication according with the response. As such, a group communication is established in a dynamic manner based on subject matter identifiers.

Figure 6:
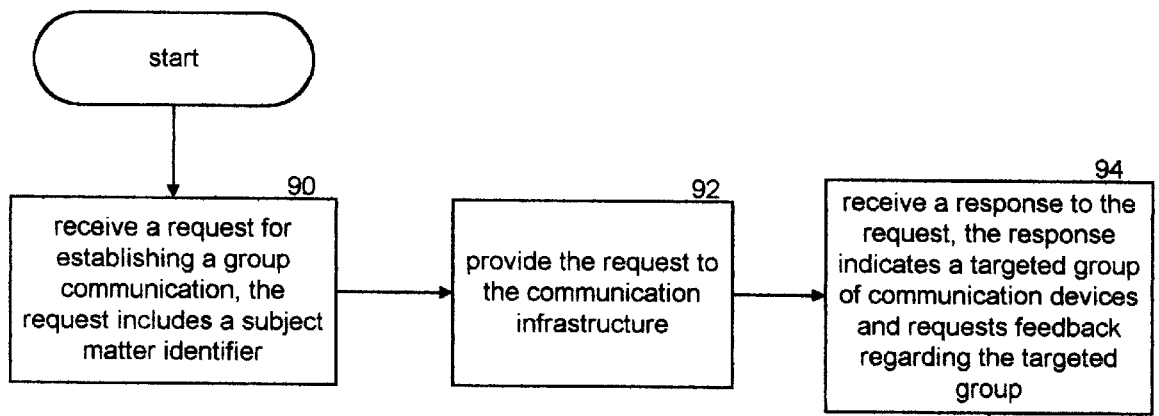
FIG. 6 illustrates a logic diagram of a method for a communication device to initiate a dynamic group communication in accordance with the present invention.

FIG. 6 illustrates a logic diagram of a method for a communication device to facilitate the establishment of a dynamic group communication. The process begins at step 90 where the communication device receives a request for establishing a group communication. The request is received via an input means, such as a keypad, selector knob, etc. and includes a subject matter identifier. The subject matter identifier may be stored in memory such that the user is accessing a pre-defined set of subject matter identifiers, or is entering a particular subject matter by name, wherein the subject matter is a user defined term. The process then proceeds to step 92 where the request is provided to the communication infrastructure. In addition to the subject matter identifier, the communication device may also provide a limitation identifier to the communication infrastructure.

The process proceeds to step 94 where the communication device receives a response to the request. The response indicates the identity of a targeted group of communication devices and requests feedback regarding the targeted group. The feedback includes a request to establish the group with the targeted communication devices, establish the group with a subset of the targeted communication devices, identify a new targeted group based on a new, or modified, subject matter identifier and/or a limitation identifier, or to cancel the group communication. Having generated the feedback, the communication device provides it to the communication infrastructure such that the infrastructure may establish the group communication.

Figure 7:
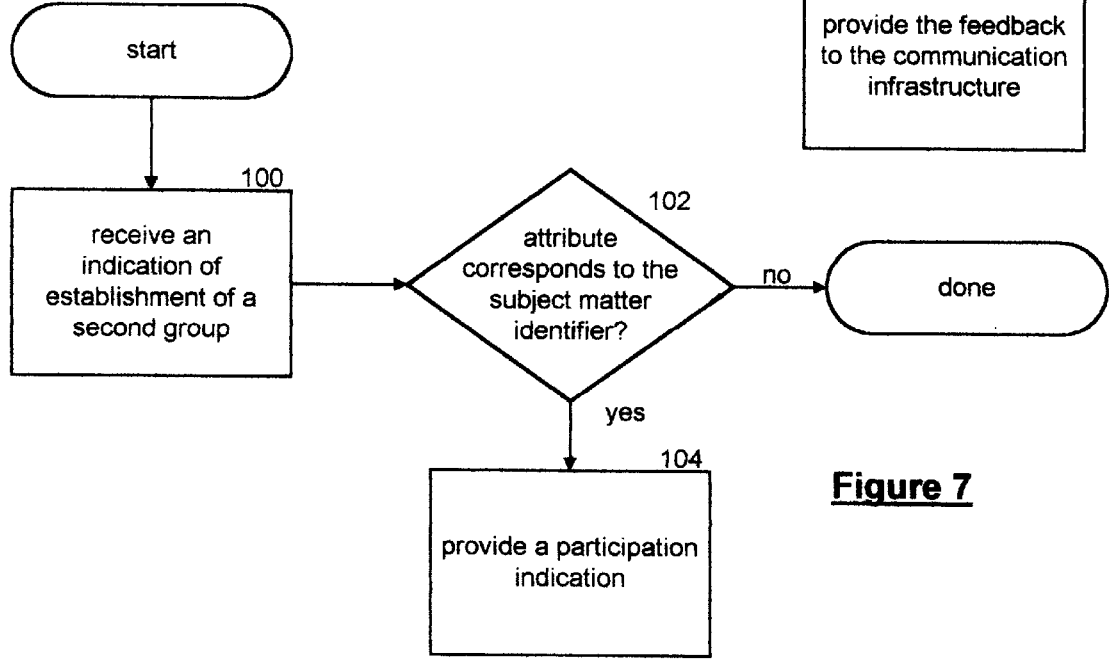
FIG. 7 illustrates a logic diagram of a method for a communication device to determine whether it should participate in a dynamic group communication in accordance with the present invention.

FIG. 7 illustrates a logic diagram of a method for a communication device to determine whether it should participate in a group communication. The process begins at step 100 where the communication device receives an indication of the establishment of a group communication. The process proceeds to step 102 where a determination is made as to whether the communication device's subject matter attributes corresponds to the subject matter identifier. If not, the process is complete. If so, the process proceeds to step 104 where the communication device provides a participation indication. The participation indication may be based on participation parameters that include geographic location, requesting party identity, time of day, and subject matter qualifications. In addition, the determination to participate may further be based on whether the communication device's attributes correspond to the limitation identifier.

The preceding discussion has presented a method and apparatus for dynamically establishing group communications in a wireless communication system based on subject matter. As such, a requesting communication device may establish a dynamic group communication based on a particular subject matter, which give operators greater flexibility in establishing group communications.

The foregoing description of a preferred embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

We claim:

1. A method for a communication infrastructure to establish dynamic group communications, the method comprising the steps of:
   receiving a request for establishing a group communication from a first communication device, wherein the request includes a subject matter identifier and wherein the subject matter identifier identifies what subject matter is intended to be orally discussed in the group communication; and
   facilitating establishment of the group communication between the first communication device and at least one communication device based on the subject matter identifier, wherein the at least one communication device has an attribute that corresponds to the subject matter identifier.

2. The method of claim 1, further comprising the steps of:
   providing an indication of the group communication to a plurality of communication devices, wherein the indication includes the subject matter identifier; and
   receiving a response to the indication from the at least one communication device.

3. The method of claim 1, further comprising the step of identifying the at least one communication device via a database look-up, wherein the database stores subject matter attributes for each of a plurality of communication devices.

4. The method of claim 1, further comprising the step of receiving a limitation identifier, wherein the limitation identifier includes at least one of a grade restriction, location restriction, and qualification restriction.

5. The method of claim 1, further comprising the step of providing an indication of the at least one communication device to the first communication device prior to establishing the group communication.

6. The method of claim 5, further comprising the step of receiving a response from the first communication device, wherein the response includes at least one of establish the group communication, a modified request, a limitation identifier, and a cancellation request.

7. The method of claim 6, further comprising the step of processing the establishment of the group communication based on the response.

8. The method of claim 1, further comprising the step of determining whether the at least one communication device is receptive to being part of the group communication.

9. The method of claim 8, further comprising the step of accessing participation parameters of the at least one communication device, wherein the participation parameters include at least one of geographic location, requesting party identity, time of day, and subject matter qualifications.

10. A method for a communication device to establish dynamic group communications, the method comprising the steps of:
    receiving a request for establishing a group communication, wherein the request includes a subject matter identifier and wherein the subject matter identifier identifies what subject matter is intended to be orally discussed in the group communication;
    providing the request to a communication infrastructure;
    receiving, from the communication infrastructure, a response to the request, wherein the response indicates a targeted group of communication devices and requests feedback regarding the targeted group of communication devices; and
    providing the feedback to the communication infrastructure.

11. The method of claim 10, further comprising step providing, as the feedback, at least one of establish a group communication, a modified request, a limitation identifier, and a cancellation request.

12. The method of claim 10, further comprising the steps of:
    receiving an indication of establishment of a second group communication, wherein the indication includes a second subject matter identifier;
    determining whether one of the communication device's subject matter attributes corresponds to the second subject matter identifier; and
    when the one of the communication device's subject matter attributes corresponds to the second subject matter identifier, providing a participation indication.

13. The method of claim 12, further comprising the step of determining whether the second subject matter identifier corresponds to participation parameters of the communication device, wherein the participation parameters include at least one of geographic location, requesting party identity, time of day, and subject matter qualifications.

14. The method of claim 10, further comprising the step of providing a limitation identifier along with the subject matter identifier, wherein the limitation identifier includes at least one of a grade restriction, location restriction, and qualification restriction.

15. A communication device comprising:
    a processing unit; and
    memory operably coupled to the processing unit, wherein the memory stores programming instructions that, when read by the processing unit, cause the processing unit to function to receive a request for establishing a group communication, wherein the request includes a subject matter identifier and wherein the subject matter identifier identifies what subject matter is intended to be orally discussed in the group communication; provide the request to communication infrastructure; receive, from the communication infrastructure, a response to the request, wherein the response indicates a targeted group of communication devices and requests feedback regarding the targeted group of communication devices; and provide the feedback to the communication infrastructure.

16. The communication device of claim 15, further comprising, within the memory, programming instructions that cause the processing unit to function to provide, as the feedback, at least one of establish a group communication, a modified request, a limitation identifier, and a cancellation request.

17. The communication device of claim 15, further comprising, within the memory, programming instructions that cause the processing unit to function to:

receive an indication of establishment of a second group communication, wherein the indication includes a second subject matter identifier;

determine whether one of the communication device's subject matter attributes corresponds to the second subject matter identifier; and provide a participation indication when the one of the communication device's subject matter attributes corresponds to the second subject matter identifier.

18. The communication device of claim 17, further comprising, within the memory, programming instructions that cause the processing unit to function to determine whether the second subject matter identifier corresponds to participation parameters of the communication device, wherein the participation parameters include at least one of geographic location, requesting party identity, time of day, and subject matter qualifications.

19. The communication device of claim 15, further comprising, within the memory, programming instructions that cause the processing unit to function to provide a limitation identifier along with the subject matter identifier, wherein the limitation identifier includes at least one of a grade restriction, location restriction, and qualification restriction.

20. A communication infrastructure controller comprising:

a processing unit; and memory operably coupled to the processing unit, wherein the memory stores programming instructions that, when read by the processing unit, cause the processing unit to function to receive a request for establishing a group communication from a first communication device, wherein the request includes a subject matter identifier and wherein the subject matter identifier identifies what subject matter is intended to be orally discussed in the group communication; and facilitate establishment of the group communication between the first communication device and at least one communication device based on the subject matter identifier, wherein the at least one communication device has an attribute that corresponds to the subject matter identifier.

21. The communication infrastructure controller of claim 20, further comprising, within the memory, programming instructions that cause the processing unit to function to:

provide an indication of the group communication to a plurality of communication devices, wherein the indication includes the subject matter identifier; and receive a response to the indication from the at least one communication device.

22. The communication infrastructure controller of claim 20, further comprising, within the memory, programming instructions that cause the processing unit to function to identify the at least one communication device via a database look-up, wherein the database stores subject matter attributes for each of the plurality of communication devices.

23. The communication infrastructure controller of claim 20, further comprising, within the memory, programming instructions that cause the processing unit to function as to provide an indication of the at least one communication device to the first communication device prior to establishing the group communication.

24. The communication infrastructure controller of claim 23, further comprising, within the memory, programming instructions that cause the processing unit to function to receive a response from the first communication device, wherein the response includes at least one of establish the group communication, a modified request, a limitation identifier, and a cancellation request.

25. The communication infrastructure controller of claim 24, further comprising, within the memory, programming instructions that cause the processing unit to function to process the establishment of the group communication based on the response.

* * * * *